US 9,176,346 B2

(12) United States Patent
Wang et al.

(10) Patent No.: US 9,176,346 B2
(45) Date of Patent: Nov. 3, 2015

(54) LIQUID CRYSTAL DISPLAY PANEL AND LIQUID CRYSTAL DISPLAY COMPRISING AUXILIARY ELECTRODE AND GATE WIRING CONNECTED IN PARALLEL

(75) Inventors: Shijun Wang, Beijing (CN); Xiaochuan Chen, Beijing (CN)

(73) Assignee: BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 233 days.

(21) Appl. No.: 13/699,565

(22) PCT Filed: Aug. 1, 2012

(86) PCT No.: PCT/CN2012/079530
§ 371 (c)(1),
(2), (4) Date: Nov. 21, 2012

(87) PCT Pub. No.: WO2013/017088
PCT Pub. Date: Feb. 7, 2013

(65) Prior Publication Data
US 2013/0148061 A1    Jun. 13, 2013

(30) Foreign Application Priority Data
Aug. 2, 2011  (CN) .......................... 2011 1 0219762

(51) Int. Cl.
*G02F 1/1345* (2006.01)
*G02F 1/1343* (2006.01)
*G02F 1/1362* (2006.01)

(52) U.S. Cl.
CPC .... *G02F 1/134309* (2013.01); *G02F 1/136286* (2013.01); *G02F 1/1345* (2013.01);
(Continued)

(58) Field of Classification Search
CPC ............ G02F 1/1345; G02F 1/136286; G02F 1/134309; G02F 2001/13629; G02F 2201/121
USPC .......... 349/139, 142, 143, 148, 149, 151, 152
See application file for complete search history.

(56) References Cited

U.S. PATENT DOCUMENTS 6,587,160 B2 * 7/2003 Lee et al. ......................... 349/40
7,129,923 B2 * 10/2006 Lu .................................. 345/92
(Continued)

FOREIGN PATENT DOCUMENTS

CN    1319834 A    10/2001
CN    1624753 A    6/2005
(Continued)

OTHER PUBLICATIONS
International Preliminary Report on Patentability dated Feb. 4, 2014; PCT/CN2012/079530.
(Continued)

Primary Examiner — Paisley L Arendt
(74) Attorney, Agent, or Firm — Ladas & Parry LLP

(57) ABSTRACT

The embodiment of present invention discloses a liquid crystal display panel and a liquid crystal display. The liquid crystal display panel comprises: a color filter substrate and an array substrate, which are assembled oppositely to form a cell; a liquid crystal layer provided between the color filter substrate and the array substrate; and a layered structure adapted to drive rotation of liquid crystal in the liquid crystal layer and comprising a gate metallic layer, a pixel electrode layer and a common electrode layer, wherein the gate metallic layer comprises a gate wiring, the common electrode layer comprises a first auxiliary electrode and a common electrode that are electrically-insulated, the pixel electrode layer comprises a pixel electrode, and the common electrode and the pixel electrodes are used to form an electric field for driving the liquid crystal; and wherein the first auxiliary electrode and the gate wiring are electrically connected so as to be connected in parallel in circuit.

11 Claims, 2 Drawing Sheets

(52) U.S. Cl.
CPC ............... *G02F2001/13629* (2013.01); *G02F 2001/134318* (2013.01); *G02F 2001/134372* (2013.01); *G02F 2201/121* (2013.01)

(56) References Cited

U.S. PATENT DOCUMENTS

| | | | |
|---|---|---|---|
| 7,808,598 B2 * | 10/2010 | Lin | 349/149 |
| 8,786,582 B2 * | 7/2014 | Shimada et al. | 345/204 |
| 2001/0050799 A1 | 12/2001 | Murade | |
| 2002/0018155 A1 | 2/2002 | Nagata et al. | |
| 2002/0131003 A1 | 9/2002 | Matsumoto | |
| 2008/0211974 A1 | 9/2008 | Ikebe | |
| 2009/0122240 A1 * | 5/2009 | Lim | 349/106 |

FOREIGN PATENT DOCUMENTS

| | | |
|---|---|---|
| CN | 101650497 A | 2/2010 |
| JP | 06-095147 A | 4/1994 |
| JP | 11-109390 A | 4/1999 |

OTHER PUBLICATIONS

First Chinese Office Action dated Mar. 26, 2014; Appln. No. 201110219762.7.

International Search Report: dated Aug. 11, 2012; PCT/CN2012/079530.

* cited by examiner

LIQUID CRYSTAL DISPLAY PANEL AND LIQUID CRYSTAL DISPLAY COMPRISING AUXILIARY ELECTRODE AND GATE WIRING CONNECTED IN PARALLEL

TECHNICAL FIELD

Embodiments of present invention relates to a liquid crystal display panel and a liquid crystal display.

BACKGROUND

In traditional technology, a propel link gate (PLG) wiring in the liquid crystal display panel is mainly used to transmit the signals output from the source integrated circuit (IC) to the gate IC, or to transmit the signals between at least two gate ICs. Usually, the PLG wiring is arranged at the periphery of a liquid crystal display panel, and prepared on the same layer as a gate line, the bottom electrode line of a storage capacitor. The manufacturing process is as follows: preparing a metallic film on the array substrate, and forming a gate line, a storage capacitor electrode line as well as a PLG wiring through a patterning process.

Because the resistance of the PLG wiring is required to be less than an upper limit value so as not to impact picture quality of a liquid crystal display, at least the following matters were found by the inventor in the process of designing and preparing the above PLG wiring.

Firstly, in designing a PLG wiring, and in order that the designed PLG wiring has resistance less than the upper limit value, an extremely fine mapping for the PLG wiring is needed when drawing a PCB layout, and further, the shape of the PLG wiring needs to be modified continuously to meet the requirement for the upper limit value, which increases the complication of the design of a PCB layout; secondly, during an actual manufacturing process, technical deviation sometimes causes the resistance of the PLG wiring to be greater than the upper limit value, and in order to avoid such technical deviation, the requirements for the manufacture technology are improved.

SUMMARY

An embodiment of present invention provides a liquid crystal display panel, composing: a color filter substrate and an array substrate, which are assembled oppositely to form a cell; a liquid crystal layer provided between the color filter substrate and the array substrate; and a layered structure adapted to drive rotation of liquid crystal in the liquid crystal layer and comprising a gate metallic layer, a pixel electrode layer and a common electrode layer, wherein the gate metallic layer comprises a gate wiring, the common electrode layer comprises a first auxiliary electrode and a common electrode that are electrically-insulated, the pixel electrode layer comprises a pixel electrode, and the common electrode and the pixel electrodes are used to form an electric field for driving the liquid crystal; wherein the first auxiliary electrode and the gate wiring are electrically connected so as to be connected in parallel in circuit.

An embodiment of present invention also provides a liquid crystal display composing the above liquid crystal display panel.

BRIEF DESCRIPTION OF THE DRAWINGS

In order to clearly illustrate the technical solution of the embodiments of the invention, the drawings needed for the description of the embodiments or the prior art will be briefly described in the following; it is obvious that the described drawings are only related to some embodiments of the invention and thus are not limitative of the invention.

DETAILED DESCRIPTION

A clearly and full description about the technical solution in the embodiments of the present invention will be prepared in the following in conjunction with drawings, and apparently, the described embodiments are only part of the described embodiments, but not the all of the embodiments. Based on the described embodiments of present invention, all the other embodiments achieved by those skilled in the art without any creative work belong to the protective scope of the present invention.

An embodiment of the present invention provide a liquid crystal display panel and a liquid crystal display, in which a PLG wiring can be prepared with less complicated design and manufacturing technology precision.

Figure 1:
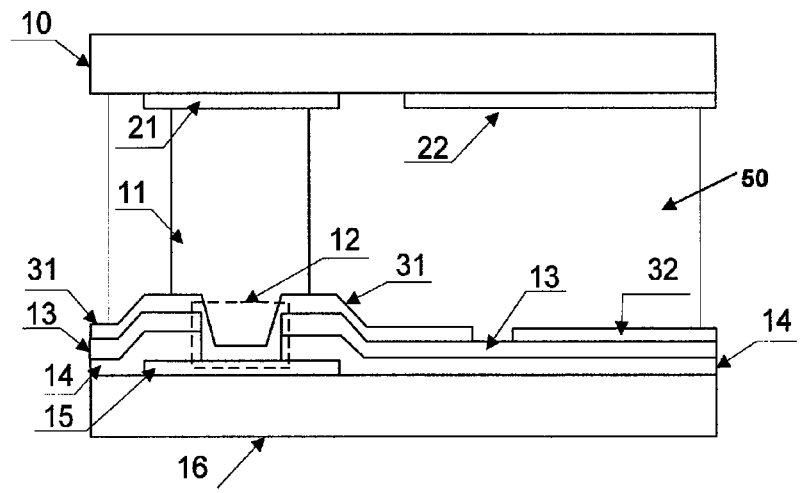
FIG. 1 is a structural schematic view of a liquid crystal display panel provided by a first embodiment.

By forming the common electrode layer comprising a first auxiliary electrode and a common electrode which are electrically-insulated from each other, and electrically connecting the first auxiliary electrode and the PLG wiring in parallel, the resistance of the circuit portion including the PLG wiring can be reduced to the resistance obtained by connecting the PLG wiring per se and the first auxiliary electrode in parallel, the fineness for patterning the PLG wiring when designing the PLG wiring can be lowered greatly, the compact of the degraded technology upon resistance of the PLG wiring can be overcome as well, and therefore the purpose of reducing design complexity as well as the technology precision is achieved. Embodiment 1 The embodiment of the present invention provides a liquid crystal display panel, as shown in FIG. 1. The liquid crystal display panel comprises: a color filter substrate 10 and an array substrate 16 which are assembled oppositely to form a cell; a liquid crystal layer 50 arranged between the color filter substrate 10 and the array substrate 16; and a layered structure used for driving rotation of liquid crystal in the liquid crystal layer 50. The layered structure comprises a gate metallic layer, a pixel electrode layer as well as a common electrode layer. The Gate metallic layer comprises a PLG wiring 15; the common electrode layer comprises a first auxiliary electrode 21 and a common electrode 22 which are electrically-insulated from each other; and the first auxiliary electrode 21 and The PLG wiring 15 are electrically connected. The PLG wiring 15 is, for example, formed in a periphery area of the liquid crystal panel outside of a display area.

The first auxiliary electrode 21 and the PLG wiring 15 are electrically connected, that is, the PLG wiring 15 and the first auxiliary electrode 21 in the circuit are connected in parallel. In this way, the resistance of the circuit portion including the PLG wiring 15 may be effectively reduced, thus reaching the goal of lowering the design complexity of the PLG wiring 15 and its manufacturing technology precision.

Further, in the case of the liquid crystal display panel shown in FIG. 1, the common electrode layer is formed on the color filter substrate 10, the pixel electrode layer is formed on the array substrate 16 and comprises a pixel electrode 32. The liquid crystal display panel of such configuration drives the rotation of liquid crystal by forming a vertical electric field between the common electrode in the common electrode layer and the pixel electrode in the pixel electrode layer. Therefore, such a liquid crystal display panel is one of vertical electric field driving type. In this embodiment, the pixel electrode layer also comprises a second auxiliary electrode 31 which is electrically-insulated from the pixel electrode 32.

The above common electrode 22 in the common electrode layer and a pixel electrode 32 in the pixel electrode layer are formed for each sub-pixel in the display area of the liquid crystal panel, and each sub-pixel comprises the common electrode 22 and the pixel electrode 32. In this case, the electrical connection between the first auxiliary electrode 21 and the PLG wiring 15 may be formed in the following manner. The first auxiliary electrode 21 and the second auxiliary electrode 31 is electrically connected, and the second auxiliary electrode 31 is, for example, electrically connected to the PLG wiring 15 through a via hole 12.

Specifically, the above layered structure may be produced as follows.

There is provided the array substrate 16, which comprises a gate metallic layer comprising the PLG wiring, a gate insulating layer, an active layer, a source-drain metallic layer, a protective layer formed thereon in this order. The PLG wiring 15 is covered by the gate insulating layer 14 and the protective layer 13 at the edge of the array substrate 16, as shown in FIG. 1; The via hole 12 is prepared in respective layers right over the PLG wiring through a patterning process, so as to expose a portion of the PLG wiring; next, the pixel electrode layer is prepared on the array substrate formed with via hole 12, and the pixel electrode layer is divided into a second auxiliary electrode 31 and a pixel electrode 32, which are electrically-insulated from each other by a patterning process.

For example, in this liquid crystal display panel, the electrical connection between the first auxiliary electrode 21 and the second auxiliary electrode 31 may be achieved in the following manner. The first auxiliary electrode 21 is electrically connected to the second auxiliary electrode 31 with conductive adhesive 11; for example, the conductive adhesive 11 is anisotropic conductive adhesive; the anisotropic conductive adhesive is, for example, conductive in the vertical direction but not conductive in the transverse direction. One example of the conductive adhesive 11 is sealant adhesive (seal glue) blended with Au balls.

This embodiment of the present invention also provides a liquid crystal display employing the above liquid crystal display panel. The liquid crystal display comprises a liquid crystal display panel. With reference to FIG. 1, the liquid crystal display panel comprises: a color filter substrate 10 and an array substrate 16 which are assembled oppositely to form a cell; a liquid crystal layer 50 arranged between the color filter substrate 10 and the array substrate 16; and a layered structure used for driving rotation of liquid crystal in the liquid crystal layer 50. The layered structure comprises a gate metallic layer, a pixel electrode layer as well as a common electrode layer. The gate metallic layer comprises a propel link gate (PLG) wiring 15. The common electrode layer comprises a first auxiliary electrode 21 and a common electrode 22 which are electrically-insulated from each other. The first auxiliary electrode 21 and the PLG wiring 15 are electrically connected.

The first auxiliary electrode 21 and the PLG wiring are electrically connected, that is, the PLG wiring 15 and the first auxiliary electrode 21 in the circuit are connected in parallel; in this way, it's possible to reduce the resistance of the circuit portion including the PLG wiring 15, thus reaching the goal of lowering the design complexity of the PLG wiring 15 and its manufacturing precision.

Further, in the liquid crystal display, the common electrode layer is formed on the color filter substrate 10, the pixel electrode layer is formed on the array substrate 16 and comprises a pixel electrode 32. The liquid crystal display panel of such configuration drives the rotation of liquid crystal by forming a vertical electric field between the common electrode in the common electrode layer and the pixel electrode in the pixel electrode layer. In this embodiment, the pixel electrode layer further comprises a second auxiliary electrode 31 which is electrically-insulated from the pixel electrode 32.

In this case, the electrical connection between the first auxiliary electrode 21 and the PLG wiring 15 may be formed in the following manner. The first auxiliary electrode 21 and the second auxiliary electrode 31 is electrically connected, and the second auxiliary electrode 31 is electrically connected to the PLG wiring 15 through a via hole 12.

The layered structure in the liquid crystal display of this embodiment can be produced by the manufacturing method described referring to the liquid crystal display panel shown in FIG. 1, which description is omitted here.

For example, in the liquid crystal display, the electrical connection between the first auxiliary electrode 21 and the second auxiliary electrode 31 may be achieved in the following manner. The first auxiliary electrode 21 is electrically connected to the second auxiliary electrode 31 by conductive adhesive 11. For example, the conductive adhesive 11 is anisotropic conductive adhesive; the anisotropic conductive adhesive is, for example, conductive in the vertical direction but not conductive in the transverse direction. One example of the conductive adhesive 11 is sealant adhesive (seal glue) blended with Au balls.

In the liquid crystal display panel and the liquid crystal display provided by the embodiment of the present invention, the first auxiliary electrode 21 is electrically connected to the second auxiliary electrode 31 through the conductive adhesive 11, and the second auxiliary electrode 31 is electrically connected to the PLG wiring 15 through the via hole 12; in this way, the electric connection between the PLG wiring 15 and the first auxiliary electrode 21 is established, that is, the first auxiliary electrode 21 and the PLG wiring 15 in this circuit is connected in parallel, thus it's possible to reduce the resistance of circuit portion including the PLG wiring 15, and reach the goal of lowering the design complexity of the PLG wiring and its manufacturing technology precision.

Embodiment 2

Figure 2:
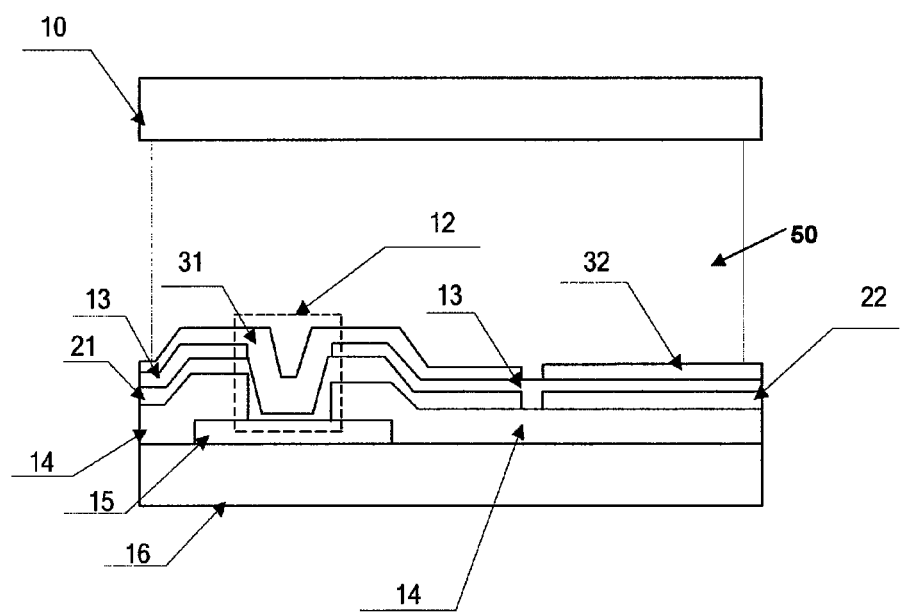
FIG. 2 is a structural schematic view of a liquid crystal display panel provided by a embodiment.

The embodiment of the present invention presents a liquid crystal display panel, as shown in FIG. 2. The liquid crystal display panel comprises: a color filter substrate 10 and an array substrate 16 which are assembled oppositely to form a cell; a liquid crystal layer 50 arranged between the color filter substrate 10 and the array substrate 16; and a layered structure used for driving rotation of liquid crystal in the liquid crystal layer 50. The layered structure comprises a gate metallic layer, a pixel electrode layer as well as a common electrode layer. The gate metallic layer comprises a propel link gate (PLG) wiring 15; the common electrode layer comprises a first auxiliary electrode 21 and a common electrode 22 which are electrically-insulated from each other; and the first auxiliary electrode 21 and the PLG wiring 15 are electrically connected. The PLG wiring 15 is formed, for example, in a periphery area of the liquid crystal panel outside of a display area.

Further, in the case of the liquid crystal display panel shown in FIG. 2, both the common electrode layer and the pixel electrode layer are formed on the array substrate 16, and the common electrode layer is below the pixel electrode layer, and the pixel electrode layer comprises a pixel electrode. The liquid crystal display panel of such configuration drives the rotation of liquid crystal by forming a fringe field between the common electrode in the common electrode layer and the pixel electrode in the pixel electrode layer. Therefore, such liquid crystal display panel is one fringe electrical field switching type. In such a liquid crystal display panel, the first auxiliary electrode 21 and the PLG wiring 15 is, for example, electrically connected with the first auxiliary electrode 21 being electrically connected to the PLG wiring 15 through the via hole 12.

Here "below" means the location closer to the array substrate 16. The common electrode layer is placed below the pixel electrode layer, that is, the common electrode layer is closer to the array substrate 16 than the pixel electrode layer.

The above common electrode 22 in the common electrode layer and a pixel electrode 32 in the pixel electrode layer are formed for each sub-pixel in the display area of the liquid crystal panel, and each sub-pixel comprises the common electrode 22 and the pixel electrode 32. In addition, the pixel electrode 32 may be formed with slits (not shown) so as to expose the common electrode 22 of the slits. Or, the common electrode 22 may further be formed with slits.

Specifically, the following method may be referred to for producing the layered structure of the liquid crystal display panel shown in FIG. 2.

There is provided an array substrate on which a gate metallic layer, a gate insulating layer, and an active layer are formed in this order. As shown in FIG. 2, the PLG wiring 15 is formed on the edge of the array substrate 16 and covered by the gate insulating layer 14; a via hole 12 is formed right over the PLG wiring 15 by a patterning process; next, a common electrode layer is formed on the array substrate formed with the via hole 12, and the common electrode layer is divided into a first auxiliary electrode 21 and a common electrode 22 which are electrically-insulated from each other by a patterning process; a first protective layer, a source-drain metallic layer, a second protective layer and a pixel electrode layer are formed on the array substrate formed with common electrode layer; and the protective layer 13 in FIG. 2 comprises the first protective layer and the second protective layer.

In order to further reduce the resistance of the circuit portion including the PLG wiring, as shown in FIG. 2, the pixel electrode layer comprises the pixel electrode 32 and the second auxiliary electrode 31 which is electrically-insulated from the pixel electrode 32

The first auxiliary electrode 21 is electrically connected to the second auxiliary electrode 31 through the second via hole 12.

Apparently, here the PLG wiring, the first auxiliary electrode 21, and the second auxiliary electrode 31 are connected in parallel in the circuit, thus reaching the goal of further reducing the resistance of the circuit portion including the PLG wiring.

This embodiment of the Present invention also provides a liquid crystal display employing the above liquid crystal display panel. The liquid crystal display comprises a liquid crystal display panel. With reference to FIG. 2, the liquid crystal display panel comprises: a color filter substrate 10 and an array substrate 16 which are assembled oppositely to form a cell; a liquid crystal layer 50 arranged between the color filter substrate 10 and the array substrate 16; and a layered structure used for driving rotation of liquid crystal in the liquid crystal layer 50. The layered structure comprises a gate metallic layer, a pixel electrode layer as well as a common electrode layer. The gate metallic layer comprises a propel link gate (PLG) wiring 15; the common electrode layer comprises a first auxiliary electrode 21 and the common electrode 22 which are electrically-insulated from each other; and the first auxiliary electrode 21 and the PLG wiring 15 are electrically connected.

Further, both the common electrode layer and the pixel electrode layer are formed on the array substrate 16, and the common electrode layer is below the pixel electrode layer, the pixel electrode layer comprises pixel electrode. The liquid crystal display panel of such configuration drives the rotation of liquid crystal by forming a fringe field between the common electrode in the common electrode layer and the pixel electrode in the pixel electrode layer. In such a liquid crystal display panel, the first auxiliary electrode 21 and the PLG wiring 15 is, for example, electrically connected with the first auxiliary electrode 21 being electrically connected to the PLG wiring 15 through a first via hole 12.

Here "below" means the location closer to the array substrate 16. The common electrode layer is placed below the pixel electrode layer, that is, the common electrode layer is closer to the array substrate 16 than the pixel electrode layer.

In order to further reduce the resistance of the circuit portion including the PLG wiring, as shown in FIG. 2, the pixel electrode layer further comprises a second auxiliary electrode 31 which is electrically-insulated from the pixel electrode 32.

The second auxiliary electrode 32 is electrically connected to the first auxiliary electrode 21 through a second via hole 12.

Here the PLG wiring 15 and the first auxiliary electrode 21, the second auxiliary electrode 31 are connected in parallel in circuit, thus reaching the goal of further reducing the resistance of the circuit portion including the PLG wiring.

It's necessary to be noted that the layered structure in the liquid crystal display of this embodiment may be produced by the manufacturing method described with reference to the liquid crystal display panel shown in FIG. 2, which description is omitted here.

This embodiment of the present invention provides a liquid crystal display panel and a liquid crystal display, in which the first auxiliary electrode 21 can be directly electrically connected to the PLG wiring 15 through the first via hole 12, that is, the first auxiliary electrode 21 and the PLG wiring in the circuit are connected in parallel, thereby reducing the resistance of the circuit portion including the PLG wiring 15 and further reaching the goal of lowering the design complexity of the PLG wiring and its manufacturing technology precision.

Embodiment 3

Figure 3:
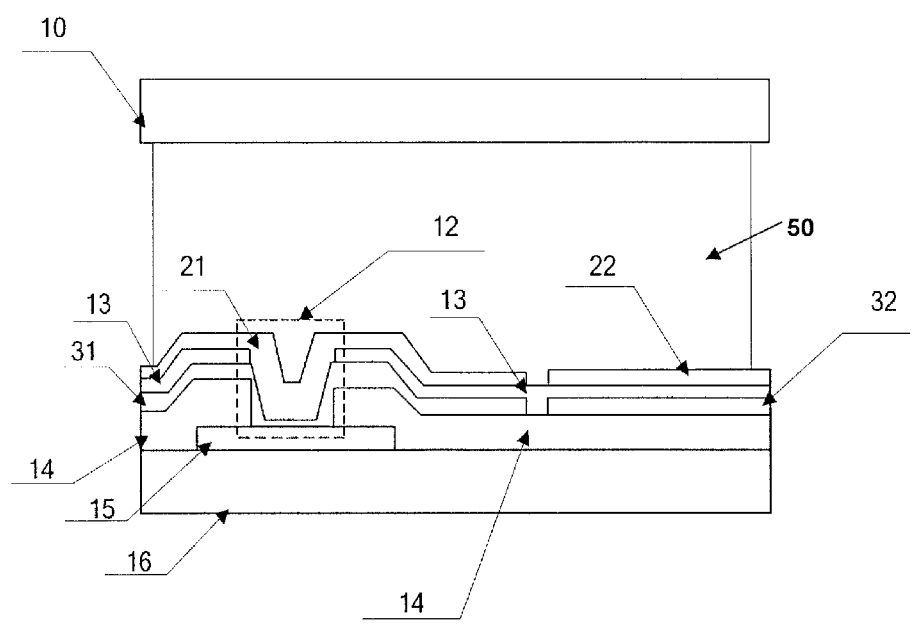
FIG. 3 is a structural schematic view of a liquid crystal display panel provided by a third embodiment.

The embodiment of the present invention presents a liquid crystal display panel, as shown in FIG. 3. The liquid crystal display panel comprises: a color filter substrate 10 and an array substrate 16 which are assembled oppositely to form a cell; a liquid crystal layer 50 arranged between the color filter substrate 10 and the array substrate 16; and a layered structure used for driving rotation of liquid crystal in the liquid crystal layer 50. The layered structure comprises a gate metallic layer, a pixel electrode layer as well as a common electrode layer. The gate metallic layer comprises a propel link gate (PLG) wiring 15; the common electrode layer comprises a first auxiliary electrode 21 and a common electrode 22 which are electrically-insulated to each other; and the first auxiliary electrode 21 and the PLG wiring 15 are electrically connected. The PLG wiring 15 is formed, for example, in a periphery area of the liquid crystal panel outside of a display area.

Further, in the liquid crystal display panel shown in FIG. 3, both the common electrode layer and the pixel electrode layer are formed on the array substrate 16, and the pixel electrode layer is below the common electrode layer and comprises a pixel electrode. The liquid crystal display panel of such configuration also drives rotation of liquid crystal by a fringe field formed between the common electrode in the common electrode layer and the pixel electrode in the pixel electrode layer, which is similar to the liquid crystal display panel provided in the second embodiment. Therefore, such liquid crystal display panel is one fringe electrical field switching type. In such a liquid crystal display panel, the pixel electrode layer further comprises a second auxiliary electrode 31 which is electrically-insulated from the pixel electrode 32.

Further, the electric connection between the first auxiliary electrode 21 and the PLG wiring 15 may be established in the following manner. The first auxiliary electrode 21 and the second auxiliary electrode 31 is electrically connected through the second via hole 12, and the second auxiliary electrode 31 is electrically connected to the PLG wiring 15 through a first via hole 12.

Here "below" means the location closer to the array substrate 16; the pixel electrode layer is placed below the pixel electrode layer, that is, the pixel electrode layer is closer to the array substrate 16 than the common electrode layer.

The above common electrode 22 in the common electrode layer and a pixel electrode 32 in the pixel electrode layer are formed for each sub-pixel in the display area of the liquid crystal panel, that is, each sub-pixel comprises the common electrode 22 and the pixel electrode 32. In addition, the common electrode 22 may be formed with slits (not shown) so as to expose the pixel electrode 32 in the slits. Otherwise, the pixel electrode 32 may further be formed with slits.

Specifically, the following method may be referred to for producing the layered structure of the liquid crystal display panel shown in FIG. 3.

There is provided an array substrate which comprising a gate metallic layer including a PLG wiring, a gate insulating layer, and an active layer formed thereon in this order. The PLG wiring 15 is covered by the gate insulating layer 14 at the edge of the array substrate, as shown in FIG. 3; A via hole 12 is prepared right over the PLG by a patterning process; next, the pixel electrode layer is prepared on the array substrate formed with a via hole 12, and the pixel electrode layer is divided into the second auxiliary electrode 31 and the pixel electrode 32 which are electrically-insulated from each other by a patterning process; a source-drain metallic layer and a protective layer 13 are formed on the array substrate formed with the pixel electrode layer, and a second via hole 12 is formed at the location of the first via hole 12 on the protective layer 13 by using a same mask plate as that for forming the first via hole 12; a common electrode layer is formed on the array substrate formed with the second via hole 12, and the common electrode layer is divided into a first auxiliary electrode 21 and a common electrode 22 which are electrically-insulated from each other by a patterning process.

This embodiment of the present invention also provides a liquid crystal display employing the above liquid crystal display panel. The liquid crystal display comprises a liquid crystal display panel. With reference to FIG. 1, the liquid crystal display panel comprises: a color filter substrate 10 and an array substrate 16 which are assembled oppositely to form a cell; a liquid crystal layer 50 arranged between the color filter substrate 10 and the array substrate 16; and a layered structure used for driving rotation of liquid crystal in the liquid crystal layer 50. The layered structure comprises a gate metallic layer, a pixel electrode layer as well as a common electrode layer. The gate metallic layer comprises a propel link gate (PLG) wiring 15; the common electrode layer comprises a first auxiliary electrode 21 and a common electrode 22 which are electrically-insulated from each other; and the first auxiliary electrode 21 and the PLG wiring 15 are electrically connected.

Further, in the liquid crystal display panel shown in FIG. 3, both the common electrode layer and the pixel electrode layer are formed on the array substrate 16, and the pixel electrode layer is below the common electrode layer and comprises a pixel electrode. The liquid crystal display panel of such configuration also drives rotation of liquid crystal by the fringe field formed between the common electrode in the common electrode layer and the pixel electrode in the pixel electrode layer, which is similar to the liquid crystal display panel provided in the second embodiment; In such a liquid crystal display panel, the pixel electrode layer further comprises a second auxiliary electrode 31 which is electrically-insulated from the pixel electrode 32.

Further, the electric connection between the first auxiliary electrode 21 and the PLG wiring 15 may be established in the following manner. The first auxiliary electrode 21 and the second auxiliary electrode 31 is electrically connected through a second via hole 12, and the second auxiliary electrode 31 is electrically connected to the PLG wiring 15 through a first via hole 12.

Here "below" means the location closer to the array substrate 16; the pixel electrode layer is placed below the pixel electrode layer, that is, the pixel electrode layer is closer to the array substrate 16 than the common electrode layer is.

It's necessary to be noted that the layered structure in the liquid crystal display of this embodiment may be produced by the manufacturing method described with reference to the liquid crystal display panel shown in FIG. 3, which description is omitted here.

This embodiment of the present invention provides a liquid crystal display panel and a liquid crystal display, in which the first auxiliary electrode 21 can be electrically connected to the second auxiliary electrode 31 through the second via hole 12, and the second auxiliary electrode 31 is electrically connected to the PLG wiring 15 through the first via hole 12, such that the first auxiliary electrode 21 and the PLG wiring 15 are electrically connected, that is, the first auxiliary electrode 21 and the PLG wiring 15 in the circuit are connected in parallel and thus reaching the goal of lowering the design complexity of the PLG wiring 15 and its manufacturing technology precision.

All the above are just certain embodiments of the present invention, but the scope of the present invention is not limited thereto, and various changes and alternation can be easily obtained by those skilled in the art within the disclosed technical scope by this invention, all of which should be encompassed in the protection reach of the present invention. Hence, the protecting scope of the present invention should be accord with the protection scope of the claims.

The invention claimed is:
1. A liquid crystal display panel, comprising:
a color filter substrate and an array substrate, which are assembled oppositely to form a cell;
a liquid crystal layer provided between the color filter substrate and the array substrate; and a layered structure adapted to drive rotation of liquid crystal in the liquid crystal layer and comprising a gate metallic layer, a pixel electrode layer and a common electrode layer, wherein the gate metallic layer comprises a gate wiring, the common electrode layer comprises a first auxiliary electrode and a common electrode that are electrically-insulated, the pixel electrode layer comprises a pixel electrode, and the common electrode and the pixel electrodes are used to form an electric field for driving the liquid crystal; and wherein the gate wiring is provided in a periphery area of the liquid crystal display panel outside of a display area of the liquid crystal display panel, and the first auxiliary electrode and the gate wiring are electrically connected so as to be connected in parallel in circuit in the periphery area.

2. The liquid crystal display panel according to claim 1, wherein the common electrode layer is formed onto the color filter substrate, and the pixel electrode layer is formed onto the array substrate.

3. The liquid crystal display panel according to claim 2, wherein the pixel electrode layer further comprises a second auxiliary electrode electrically-insulated from the pixel electrode, and the first auxiliary electrode and the second auxiliary electrode are electrically connected, and the second auxiliary electrode is electrically connected to the gate wiring through a via hole.

4. The liquid crystal display panel according to claim 3, wherein the first auxiliary electrode and the second auxiliary electrode are electrically connected through conductive adhesive.

5. The liquid crystal display panel according to claim 4, wherein the conductive adhesive is anisotropic conductive adhesive.

6. The liquid crystal display panel according to claim 1, wherein the common electrode layer and the pixel electrode layer are both formed above the array substrate, and the common electrode layer is below the pixel electrode layer; and the first auxiliary electrode is directly electrically connected to the gate wiring through a first via hole.

7. The liquid crystal display panel according to claim 6, wherein the pixel electrode layer further comprises a second auxiliary electrode electrically-insulated from the pixel electrode; and the second auxiliary electrode is electrically connected to the first auxiliary electrode through a second via hole.

8. The liquid crystal display panel according to claim 7, wherein the pixel electrode is formed with slits.

9. The liquid crystal display panel according to claim 1, wherein the common electrode layer and the pixel electrode layer are both formed above the array substrate, and the common electrode layer is below the pixel electrode layer; the pixel electrode layer further comprises a second auxiliary electrode electrically-insulated from the pixel electrode; and the first auxiliary electrode and the second auxiliary electrode are electrically connected through a second via hole, and the second auxiliary electrode is electrically connected to the gate wiring through a first via hole.

10. The liquid crystal display panel according to claim 9, wherein the common electrode is formed with slits.

11. A liquid crystal display comprising the liquid crystal display panel according to claim 1.

\* \* \* \* \*